Feb. 21, 1939.　　　　S. C. LYONS　　　　2,147,774
PROCESS OF REFINING CLAY
Filed July 14, 1936
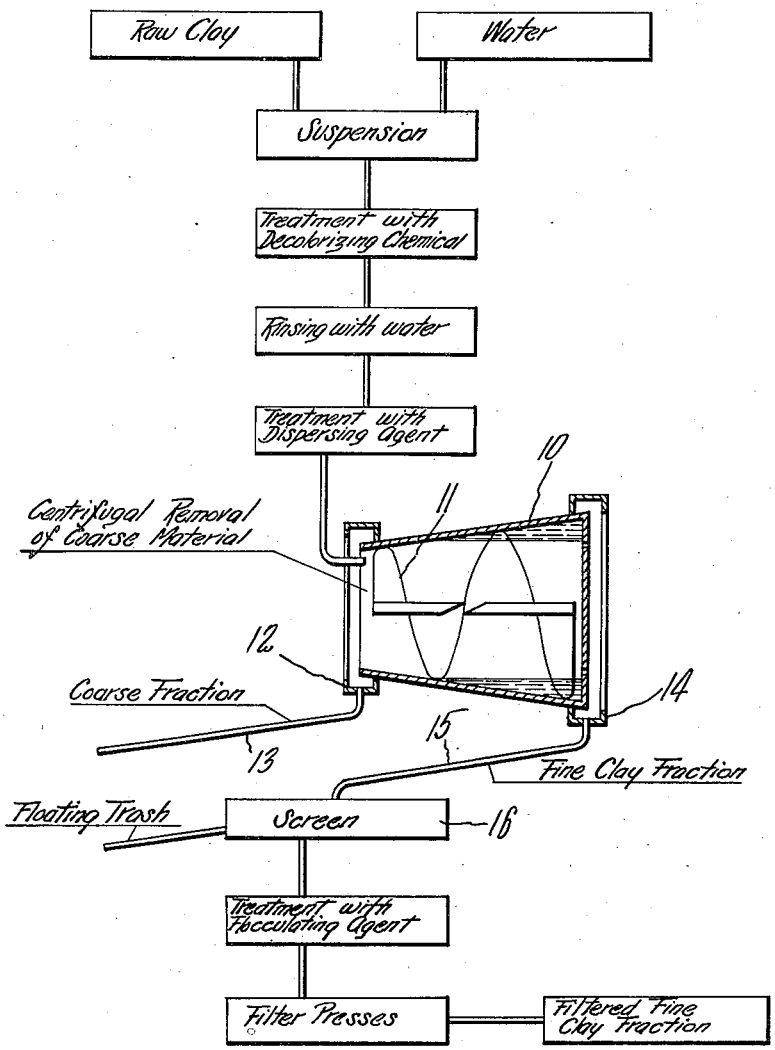

Patented Feb. 21, 1939

2,147,774

UNITED STATES PATENT OFFICE 2,147,774

PROCESS OF REFINING CLAY

Sanford C. Lyons, Bennington, Vt., assignor to Bird Machine Co., Walpole, Mass., a corporation of Massachusetts Application July 14, 1936, Serial No. 90,474

7 Claims. (Cl. 252—8)

This invention relates to a process of refining clay more particularly with the objective of producing a refined clay product of especial value in the manufacture of body-filled papers and coated or surface-filled printing papers, for instance, magazine and book papers, coated cardboards, paperboards, etc. For such purposes, it is desirable that paper be possessed of such characteristics as high whiteness, smoothness, gloss, and opacity and thus be capable of receiving clean-cut imprints with minimum "show-through" to the opposite face of the paper.

The process of the present invention comprises chemical and mechanical treatments of clay that contribute to the realization of the aforementioned objective. Thus, the clay while in aqueous suspension is put through a chemical decolorizing treatment that serves to eliminate color attributable to ferruginous or other compounds present as impurities therein; and while in aqueous suspension, the clay is also subjected to centrifugation that throws out of suspension onto the centrifuge wall a fraction consisting substantially only of the comparatively coarse particle size clay and impurities, leaving in the suspension or effluent from the centrifuge a fraction consisting substantially only of comparatively fine clay particles below a predetermined particle size, which latter fraction is recovered from suspension and by reason of its content of comparatively very fine and colloidal clay particles is eminently useful in paper-coating compositions and as a filler or loader in papermaking stocks. By virtue of the comparatively very fine size and the decolorized condition of the fine fraction recovered from suspension or effluent leaving the centrifuge, papers body-filled or surface-coated with compositions containing such recovered fraction are of excellent whiteness, homogeneity or smoothness of surface, gloss, and opacity.

The accompanying drawing illustrates schematically the invention hereof, including a continuous-flow centrifuge such as is preferably employed for separating the clay into a coarse clay fraction and an effluent suspension containing the residual fine clay fraction, which latter fraction may be recovered from suspension by various treatments for use in preparing paper-coating compositions.

I shall now describe procedures that may be adopted pursuant to the present invention. Crude or freshly quarried clay containing sand, quartz, sericite or other oversized impurities as well as coloring impurities, particularly ferric oxide or other coloring ferruginous compounds, is first admixed with water to form a substantially homogeneous and fluent suspension of moderately high solids content, preferably a suspension of about 20% to 35% solids content. The suspension is then treated with a suitable reducing agent or decolorizing chemical, such as sulphurous acid or sodium bisulphite admixed with zinc, e. g., zinc dust, hyposulphurous acid, sodium hyposulphite, or the like, which serves to transform the ferric oxide and other coloring compounds to colorless, water-soluble compounds. In practice, the decolorizing treatment may be carried out in a mixing tank with the addition of the reducing agent or decolorizing chemical in excess of that established to decolorize the coloring compounds as far as possible. In order to prevent the decolorized, dissolved impurities from resuming their original coloration of the clay by reason of oxidation, action of light thereupon, etc., it is preferable to rinse or wash the decolorized clay suspension one or more times with considerable water, the rinsing or rinsings being followed by the decantation of the rinsing water carrying the dissolved decolorized impurities from the suspension. The treatment of the clay suspension with the decolorizing chemical may be performed either before or after coarse impurities, such as mica and sand, have been removed from the suspension by settling or otherwise. Because of the high concentration of solids in the suspension, only a comparatively small amount of decolorizing chemical is necessary to create in the suspension ample concentration of such chemical for accomplishing the desired decolorizing reaction upon the coloring compounds.

Once the clay has been decolorized, a suitable dispersing or deflocculating agent, such as sodium silicate, may be admixed with the decolorized aqueous clay suspension in comparatively small amount, say, about 1%, based on the solids content of the suspension, for the purpose of deflocculating such aggregates of intrinsically fine clay particles as may exist in the particular clay constituting the raw material or as may tend to develop in an aqueous suspension prepared from such clay. Such treatment of the aqueous clay suspension with a dispersing or deflocculating agent tends to increase the yield of the desired fine clay fraction recoverable upon centrifugation of the suspension. The increased yield in recovery of fine particles or fine fraction is attributable in substantial measure to the fact that the dispersing agent for the clay produces such a drastic decrease in viscosity of the clay slip that there is a greatly diminished tendency for the entrainment or entanglement of the fine clay particles with the coarser ones as the coarser ones are caused to subside or deposit out during centrifugation of the slip. The clay suspension containing the dispersing or deflocculating agent may, as illustrated in the drawing, then be delivered at appropriate solids content, say, about 20% to 35%, to a continuous flow centrifuge 10, for instance, of the type illustrated and described in detail in my patent application Serial No. 756,954, filed December 11, 1934. Such centrifuge includes, as shown, a frusto-conical shell and a propelling screw 11 which functions to discharge solids depositing on the internal wall of the shell through the small diameter end of the shell as substantially grit-free suspension is being emitted through its large diameter end. The suspension is fed into the centrifuge preferably adjacent to its small diameter end, thereby causing the suspension to traverse substantially the full length of the centrifuge and thus be acted upon by centrifugal force for substantially the maximum period of time commensurate with the particular volumetric flow of suspension being maintained through the centrifuge. The conditions of operation of the centrifuge, including its effective diameter, its rate of rotation, and the rate of flow of suspension therethrough, are, as hereinafter stated, substantially constant and are conjunctively such as to conduce to the deposition of essentially only comparatively coarse clay solids on the internal wall of the centrifuge; and when the suspension has not been preliminarily rid of oversized impurities, such as sand, quartz, mica, and other grit, by settling or otherwise, such impurities are also deposited along with the comparatively coarse clay fraction on the centrifuge wall. The coarse clay solids and oversized impurities are received from the small diameter end of the centrifuge in an annular trough 12 and are discharged through a pipe 13, whence they may be recovered and used in the manufacture of certain classes of paper, ceramics, and for other purposes, such as for filling rubber compounds, for instance, in rubber compounds to be molded into storage-battery boxes or to be fabricated into floor coverings. The substantially grit-free suspension or effluent containing the comparatively very fine and colloidal clay particles is received from the large diameter end of the centrifuge in an annular trough 14 and may, if desired, be delivered therefrom through a pipe 15 through a rotary or other suitable screen 16 which serves to eliminate from the suspension such fibrous material as bark, wood, or other floating trash.

The suspension containing the comparatively fine clay fraction may then be subjected to suitable treatments for the recovery of such fraction therefrom. While the recovery treatments may be those disclosed in my application Serial No. 2,369, filed January 18, 1935, and involve the progressive separation of the very fine clay solids from suspension in an electrophoretic centrifuge, the present invention comprehends other simple and effective steps for recovering the fine clay fraction from suspension. Thus, the suspension of the fine clay fraction or effluent from the centrifuge may advantageously be treated with a suitable flocculating agent, such as alum, in the amount of, say, about 1%, based on the dry weight of the solids in suspension, whereupon the flocculated fine clay solids may then be readily recovered from the suspension by filtration in filter presses or the like such as are currently used in the clay industry.

The decolorized fine clay fraction as recovered by filtration may be added as a filler to paper-making stock in the beater engine; or it may be used in preparing paper-coating compositions, which are usually made up as aqueous compositions with suitable binding or sizing agents, such as casein, and applied by spreading on the surface of the prefabricated paper sheet. While it is possible to ship the fine fraction as filter-pressed cakes of substantial water content, e. g., 30%, from the clay works to a paper-making mill and this expedient has, in fact, on occasion been adopted with good results, for instance, with what appears to be worthwhile improvement in the retention of the clay particles by papermaking stock in the beater engine, yet, it is ordinarily preferable to dry the filtered fine clay fraction when it is to be shipped from the clay works to the papermaking mill so as to facilitate its handling and lower the transportation cost. Depending upon the particular quality or origin of crude clay and the fineness of particle size desired in the recovered fine clay fraction, about 50% to 25% of the solids content of the original clay suspension may be recovered as a fine clay fraction for use in the highest grade of body-filled and surface-coated papers. Thus, clays quarried at Bennington, Vermont, were found to yield the desired fine clay fraction in the amount of about 30% to 40%, based on the dry solids of the original or freshly quarried clay. Of course, the conditions of operation of the centrifuge in which fractionation of the suspension is effected, including such factors as the effective diameter of the centrifuge, its rate of rotation, the rate of flow of suspension therethrough, the solids content of the suspension being centrifuged, and the viscosity of the suspension as affected by dispersing or deflocculating agents, are controlled so as to cause an emission from the centrifuge of a fine fraction in suspension containing particles of the particular desired fine particle size and representing a particular percentage of the solids of the original clay, which percentage may, as already indicated, vary considerably.

While the chemical decolorizing treatment might be omitted in the practice of the process hereinbefore described, it is of advantage in that it enhances the whiteness of the fine clay fraction and, accordingly, its value for paper-loading and paper-coating purposes. Should the chemical decolorizing treatment be omitted, one may proceed to fractionate the clay suspension to which the dispersing or deflocculating agent has been added by the centrifugal treatment hereinbefore described either before or after coarse or oversized impurities, such as mica and sand, have been removed by settling or otherwise from the suspension. For instance, in respect of clays quarried at Bennington, Vermont, the aqueous suspensions or slips prepared therefrom have been preliminarily rid of grit or oversized impurities in such instrumentalities as settling sluices, bowl-classifiers, "Dorr" classifiers, and the like. The effluent from the centrifuge containing the fine clay fraction may then be treated with a suitable amount of alum or equivalent flocculating salt and the flocculated fine clay fraction removed from suspension by filtration. While a continuous flow centrifuge, which may be that commercially known as a "Laughlin" centrifuge, has been described as the instrumentality for effecting the fractionating step hereof because it permits of continuous and more economical operation and because the conditions of centrifugation can be maintained constant in the conduct of the process to yield a fine clay fraction of definite and reproducible quality, it is possible to use a discontinuous or batch type of centrifuge on whose wall a coarse solids fraction is accumulated or deposited until a certain thickness of solids layer of accumulation is had and which is stopped to discharge such solids layer. In such latter event, the effective centrifugal force at play on the suspension varies as the thickness of the layer or deposit on the centrifugal wall increases and the detention period or effective volumetric capacity in the centrifuge, which also affects the quality or fineness of the fine clay fraction recoverable, also varies even more drastically with the thickness of the layer or deposit; and additional labor cost and lower output are consequences of the necessary interruptions or stoppages of the centrifuge.

So far as concerns certain subject matter, this application is a continuation-in-part of my application Serial No. 2,369, filed January 18, 1935.

I claim:

1. A process of refining clay containing coloring impurities to produce a clay product particularly adapted for use in high grade body-filled and surface-coated papers, which comprises mixing such clay with water to form an aqueous clay suspension, treating the resulting suspension with a chemical capable of decolorizing and dissolving said coloring impurities, washing the clay suspension with water so as to carry away therefrom the decolorized and dissolved impurities, adding to the washed suspension a dispersing agent for the clay, continuously centrifuging the resulting decolorized and dispersed clay suspension under substantially constant solids-depositing conditions, including substantially constant effective centrifuging force, to remove a substantial coarse solids fraction therefrom, including the coarse clay particles, thereby leaving therein throughout the centrifuging operation substantially only comparatively fine and colloidal clay particles below a predetermined particle size, and recovering from the resulting suspension said comparatively fine and colloidal particles.

2. A process of refining clay containing coloring impurities, including ferric oxide, to produce a clay product particularly adapted for use in high grade body-filled and surface-coated papers, which comprises mixing such clay with water to form an aqueous clay suspension, treating the resulting suspension with a reducing agent capable of transforming said ferric oxide and other coloring impurities into substantially colorless, water-soluble compounds, washing the clay suspension with water so as to carry away therefrom the decolorized and dissolved impurities, adding to the washed suspension a dispersing agent for the clay, continuously centrifuging the resulting decolorized and dispersed clay suspension under substantially constant solids-depositing conditions, including substantially constant effective centrifuging force, to remove a substantial coarse solids fraction therefrom, including the coarse clay particles, thereby leaving therein throughout the centrifuging operation substantially only comparatively fine and colloidal clay particles below a predetermined particle size, and recovering from the resulting suspension said comparatively fine and colloidal clay particles.

3. A process of refining clay containing coloring impurities, including ferric oxide, to produce a clay product particularly adapted for use in high grade body-filled and surface-coated papers, which comprises mixing such clay with water to form an aqueous clay suspension of about 20% to 35% solids content, treating the resulting suspension with a reducing agent capable of transforming said ferric oxide and other coloring impurities into substantially colorless, water-soluble compounds, washing the clay suspension with water so as to carry away therefrom the decolorized and dissolved impurities, adding to the washed suspension a dispersing agent for the clay, continuously centrifuging the resulting decolorized and dispersed clay suspension at a solids content of about 20% to 35% and under substantially constant solids-depositing conditions, including substantially constant effective centrifuging force, to remove a substantial coarse solids fraction therefrom, including the coarse clay particles, thereby leaving therein throughout the centrifuging operation substantially only comparatively fine and colloidal clay particles below a predetermined particle size, and recovering from the resulting suspension said comparatively fine and colloidal clay particles.

4. A process of refining clay containing coloring impurities, including ferric oxide, to produce a clay product particularly adapted for use in high grade body-filled and surface-coated papers, which comprises mixing such clay with water to form an aqueous clay suspension, treating the resulting suspension with a reducing agent capable of transforming said ferric oxide and other coloring impurities into substantially colorless, water-soluble compounds, washing the clay suspension with water so as to carry away therefrom the decolorized and dissolved impurities, adding to the washed suspension a dispersing agent for the clay, continuously centrifuging the resulting decolorized and dispersed clay suspension under substantially constant solids-depositing conditions, including substantially constant effective centrifuging force, to remove a substantially coarse solids fraction, including coarse clay particles, corresponding with a residuum therein of about 50% to 25%, based on the solids of the original clay suspension, of substantially only comparatively fine and colloidal clay particles below a predetermined particle size throughout said centrifuging operation, and recovering from the resulting suspension said comparatively fine and colloidal clay particles.

5. A process of refining clay containing coloring impurities, including ferric oxide, to produce a clay product particularly adapted for use in high grade body-filled and surface-coated papers, which comprises mixing such clay with water to form an aqueous clay suspension of about 20% to 35% solids content, treating the resulting suspension with a reducing agent capable of transforming said ferric oxide and other coloring impurities into substantially colorless, water-soluble compounds, washing the clay suspension with water so as to carry away therefrom the decolorized and dissolved impurities, adding to the washed suspension a dispersing agent for the clay, continuously centrifuging the resulting decolorized and dispersed clay suspension at a solids content of about 20% to 35% and under substantially constant solids-depositing conditions including substantially constant effective centrifuging force, to remove a substantial coarse solids fraction, including coarse clay particles, corresponding with a residuum therein of about 50% to 25%, based on the solids of the original clay suspension, of substantially only comparatively fine and colloidal clay particles below a predetermined particle size throughout said centrifuging operation, and recovering from the resulting suspension said comparatively fine and colloidal clay particles.

6. A process of refining clay containing coloring impurities to produce a clay product particularly adapted for use in high grade body-filled and surface-coated papers, which comprises mixing such clay with water to form an aqueous clay suspension, treating the resulting suspension with a chemical capable of decolorizing and dissolving said colored impurities, washing out the decolorized and dissolved impurities substantially completely from the clay suspension, adding to the washed suspension a dispersing agent for the clay, continuously centrifuging the resulting decolorized and dispersed clay suspension under substantially constant solids-depositing conditions, including substantially constant effective centrifuging force, to remove a substantial coarse solids fraction therefrom, including the coarse clay particles, thereby leaving therein substantially only comparatively fine and colloidal clay particles below a predetermined particle size throughout said centrifuging operation, and flocculating and recovering from the resulting suspension said comparatively fine clay particles.

7. A process of refining clay containing coloring impurities, including ferric oxide, to produce a clay product particularly adapted for use in high grade body-filled and surface-coated papers, which comprises mixing such clay with water to form an aqueous clay suspension, treating the resulting suspension with a reducing agent capable of transforming said ferric oxide and other coloring impurities into substantially colorless, water-soluble compounds, washing out the substantially colorless, water-soluble compounds substantially completely from the clay suspension, adding to the washed suspension a dispersing agent for the clay, continuously centrifuging the resulting decolorized and dispersed clay suspension under substantially constant solids-depositing conditions, including substantially constant effective centrifuging force, to remove a substantial coarse solids fraction therefrom, including the coarse clay particles, thereby leaving therein substantially only fine and colloidal clay particles below a predetermined particle size throughout said centrifuging operation, and flocculating and filtering out from the resulting suspension said comparatively fine and colloidal clay particles.

SANFORD C. LYONS.